US007818333B2

(12) United States Patent
Biard et al.

(10) Patent No.: US 7,818,333 B2
(45) Date of Patent: Oct. 19, 2010

(54) UNIVERSAL ADDRESS PARSING SYSTEM AND METHOD

(75) Inventors: John R. Biard, Frederick, CO (US);
Freddie J. Bourland, II, Longmont, CO (US)

(73) Assignee: Pitney Bowes Software Inc., Lanham, MD (US)

( * ) Notice: Subject to any disclaimer, the term of this patent is extended or adjusted under 35 U.S.C. 154(b) by 491 days.

(21) Appl. No.: 11/810,574

(22) Filed: Jun. 6, 2007

(65) Prior Publication Data

US 2008/0162513 A1 Jul. 3, 2008

Related U.S. Application Data

(60) Provisional application No. 60/877,727, filed on Dec. 28, 2006.

(51) Int. Cl.
*G06F 17/30* (2006.01)

(52) U.S. Cl. .................. 707/763; 707/709; 707/741; 707/742; 707/743; 707/744; 707/745; 707/746; 707/755; 707/797

(58) Field of Classification Search ............. None
See application file for complete search history.

(56) References Cited

U.S. PATENT DOCUMENTS

| 4,989,151 | A | 1/1991 | Nuimura |
| 5,381,338 | A | 1/1995 | Wysocki et al. |
| 5,470,233 | A | 11/1995 | Fruchterman et al. |
| 5,687,384 | A | 11/1997 | Nagase |
| 5,796,634 | A | 8/1998 | Craport et al. |
| 6,016,393 | A | 1/2000 | White et al. |
| 6,101,496 | A | 8/2000 | Esposito |
| 6,292,743 | B1 | 9/2001 | Pu et al. |
| 6,363,411 | B1 | 3/2002 | Dugan et al. |

(Continued)

FOREIGN PATENT DOCUMENTS

WO    WO 02/097726    12/2002

OTHER PUBLICATIONS

Moshos, George J.,"Analog interpolator for Automatic Control", 1955, pp. 83-91.

(Continued)

*Primary Examiner*—Baoquoc N To
(74) *Attorney, Agent, or Firm*—Michael J. Cummings; Angelo N. Chaclas

(57) ABSTRACT

A method and system for parsing of input addresses for further automated processing. A relevant locale for an input address is determined. Based on the locale, an applicable parsing tree is provided so that different address formats can be tested against the input address. The parsing tree is generated from a local address format specification that defines permissible formats for the locale. The local address format specification and the local address component rules are provided to a parsing engine to determine one or more potential parsed addresses based on compliance with specifications. The local address component rules specification is applied to the input address to determine one or more branches of the parsing tree for which the input address matches criteria of the component rules specification. Penalties may be assigned to branches of the tree when disfavored matches occur. The various branches can be ranked based on their penalties to determine the best matches to be provided to the geocoding system.

9 Claims, 2 Drawing Sheets

U.S. PATENT DOCUMENTS

| | | | |
|---|---|---|---|
| 6,373,817 | B1 | 4/2002 | Kung et al. |
| 6,516,337 | B1 | 2/2003 | Tripp et al. |
| 6,552,670 | B2 | 4/2003 | Sundaravel et al. |
| 6,604,046 | B1 | 8/2003 | Van Watermulen et al. |
| 7,039,640 | B2 | 5/2006 | Miller et al. |
| 7,333,987 | B2 * | 2/2008 | Ross et al. ................... 707/9 |
| 2002/0000999 | A1 | 1/2002 | McCarty et al. |
| 2002/0143462 | A1 * | 10/2002 | Warren ................... 701/200 |
| 2002/0160766 | A1 | 10/2002 | Portman et al. |
| 2003/0036379 | A1 | 2/2003 | Nikolai et al. |
| 2006/0106596 | A1 | 5/2006 | Weise |

OTHER PUBLICATIONS

Belfore, et al., "An interactive land use VRML application (ILUVA) with servlet assist", 2000, Society for computer simulation internal, pp. 1823-1830.

B. Meltzer, et al., "XML and Electronic Commerce: Enabling the Network Economy", VEO Systems, Sigmod Record, vol. 27, No. 4, Dec. 1998.

R. J. McNab, et al., "A Distributed Digital Library Architecture Incorporating Different Index Styles," Research and Technology Advances in Digital Libraries, 1998, IEEE International Forum on Proceedings, Apr. 22-24, 1998, pp. 36-45.

Rogers, et al., "Mining GPS Data to Augument Road Model", 1999, ACM Press, pp. 104-113.

Kumar, et al., "Intergrating geographic information systems, spatial digital libraies and information spaces for conducting humanitarian assistance and distastars relief operations in urban environment", 1999, ACM Press.

R. J. Glushko, et al., "A XML Framework for Agent-based E-Commerce," Communications of the ACM, vol. 42, No. 3, Mar. 1999.

Vazary,M., Tripp, T., "E-mail Harvesting", Research Disclosure, Mason Publications, Hampshire GB, 2004, vol. 487, No. 54.

"ParseRat—Manual",[online], 2004, XP002503092, pp. 2-22.

* cited by examiner

UNIVERSAL ADDRESS PARSING SYSTEM AND METHOD

This application claims the benefit under 35 U.S.C. §120 of provisional application 60/877,727, titled UNIVERSAL ADDRESS PARSING SYSTEM AND METHOD, filed Dec. 28, 2006, which is hereby incorporated by reference in its entirety.

FIELD OF THE INVENTION

The present invention relates to a software engine for parsing addresses into their component parts, easily adaptable for use in many international applications.

BACKGROUND OF THE INVENTION

A geocoding system is a software tool that is used to determine the geographic location for a particular address. A user inputs an address, and the system outputs the coordinates of the address, or perhaps provides a map showing the vicinity of the address.

Sometimes an exact location for an address is known within the system. Other times, algorithms are applied to provide a sophisticated best estimate based on the available data. An example of a geocoding system is described in U.S. patent application Ser. No. 11/317,503, titled GEOCODING AND ADDRESS HYGIENE SYSTEM EMPLOYING POINT LEVEL AND CENTERLINE DATA SETS, filed Dec. 22, 2005, assigned to the assignee of the present application, and incorporated by reference herein.

For a geocoding system to do its job properly, it is important that the initial address input be properly understood by the system. Input text must be parsed, or "made sense of" as an address before further analysis such as matching the input to a reference database of addresses, scoring the address match, and outputting results can occur. Parsing an input address means reducing a sequence of words composing an address line (like "123 Main Street") into individual address elements (e.g., house number="123", street name="Main", and street type="Street"). In different countries, and even within a single country, address lines differ by language, appearance of elements, order of elements, and delivery mode (such as P O Box, General Delivery, street address, Intersection, etc).

This goal of accurate parsing is complicated by various factors including the following: (1) there are many different valid address formats in a given country; (2) addresses can be written and abbreviated many different ways; (3) written segments, such as directional and ordinal elements (north, east, south, west, $1^{st}$, second, 100, . . . ), may be applicable to different address components; (4) input address may have errors or be incomplete; (5) depending on how it is parsed, an input address could refer to multiple actual addresses; (6) a single interpretation of an input address may refer multiple actual addresses; and (7) differences between valid written addresses for two distinct locations may be small.

To allow a geocoding system to understand the address being input, it can employ an address parsing program to analyze the input address so that the component parts are recognized and interpreted. Once the input address has been parsed, the parsed address can be processed in view of the postal and street network geocoding data, which are themselves organized based on address component elements.

In a conventional international geocoding system it is necessary to have multiple parsing engines. Since different regions and countries have different languages, different formats, and different rules for formulating addresses, it has been necessary to code separate parsing engines for each region and country. For example, see U.S. Patent U.S. Pat. No. 7,039,640 (incorporated by reference herein) which states that "In view of the diversity of address formats in the world, there is no generic address parser. Therefore, a suitable parser has to be created or instantiated for each country or jurisdiction(s) sharing a common addressing format." (Col. 9, lines 4-8). Writing those separate parsers is time-consuming, redundant, inefficient, and error-prone.

SUMMARY OF THE INVENTION

The improved system described herein provides an improved method and system for parsing addresses. Among other things, this invention avoids the need to write special-purpose software for each country and for each address delivery mode within that country. Instead, it defines a single, universal parser that is driven by external, human readable address line definitions and parsing rules (i.e., an "address grammar") that are created for each locale (combination of country and language) for which addresses are to be parsed.

The improvement may include receiving an input address and determining a relevant locale for that address. Based on the relevant locale, an applicable parsing tree is provided so that different permissible combinations of address components can be tested against the input address. The parsing tree is generated from a local address format specification that defines permissible formats for the locale. Local address component rules are another set of specifications that defines address components for a given locale.

The local address format specification and the local address component rules are provided to a parsing engine to determine one or more potential parsed addresses based on compliance with specifications. The local address component rules specification is applied to the input address to determine one or more branches of the parsing tree for which the input address matches criteria of the component rules specification. Penalties are assigned to branches of the tree when disfavored matches occur. The various branches can be ranked based on their penalties to determine the best matches to be provided to the geocoding system.

BRIEF DESCRIPTION OF THE DRAWINGS

Reference is now made to the various figures wherein like reference numerals designate similar items in the various figures and in which.

DETAILED DESCRIPTION OF THE PREFERRED EMBODIMENT

Figure 1:
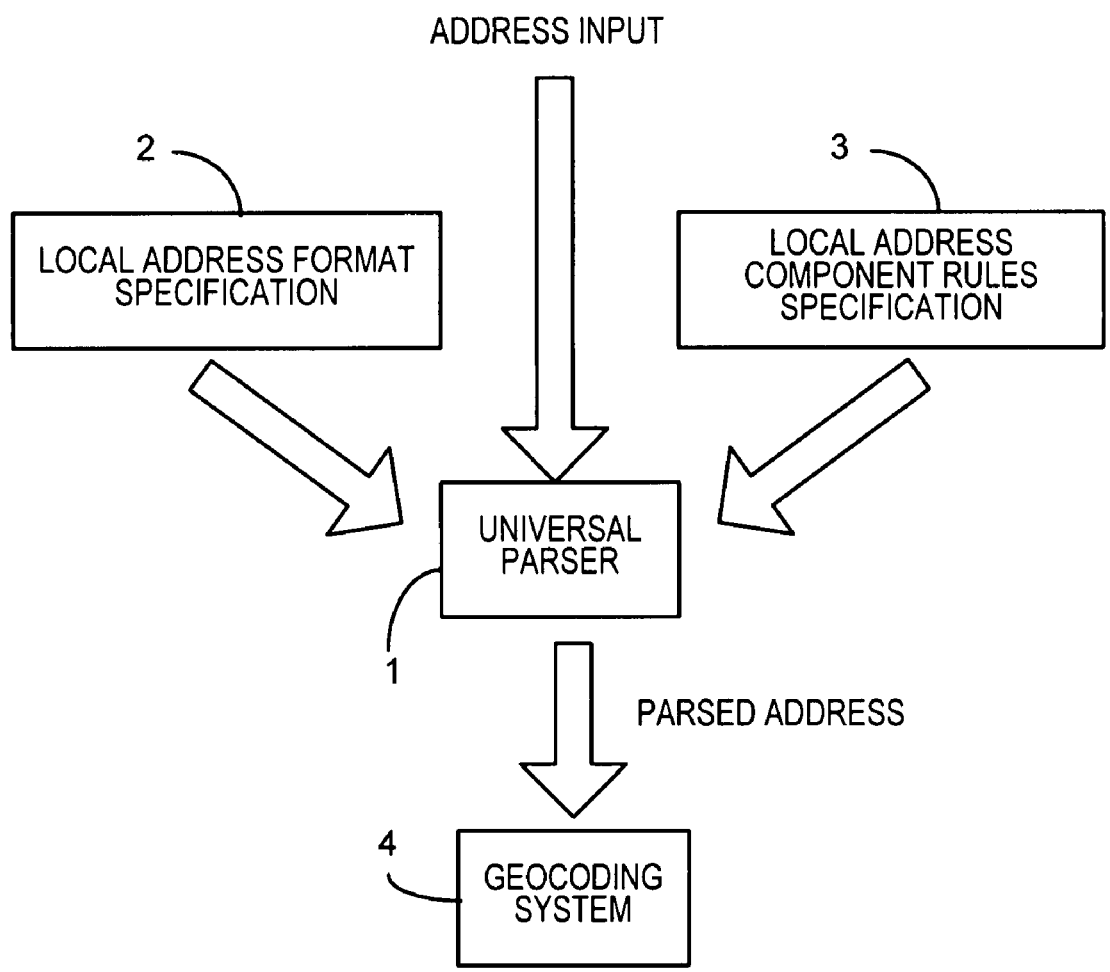
FIG. 1 is a block diagram of an embodiment of a parsing system in accordance with the present invention.

FIG. 1 depicts a basic embodiment of the present invention. This embodiment is a general purpose address parsing engine. It has no preconceived notion of the language, address elements, order of address elements, or delivery mode of the addresses it needs to parse. A universal parser 1 is used for all regions and countries for which the parsing system is used. When the parser 1 is initiated for use, two external files 2, 3 are read. These files are maintained separately for a local address format specification 2 and a local address component rules specification rules specification 3. Local files 2 and 3 are data files that include all of the address formats and rules that vary from region to region.

The universal parser 1 is made applicable to a new region by adding new format and rule specifications 2 and 3. In the preferred embodiment, separate specification files are maintained for the format and rule specifications 2 and 3, with further separate files for each different region. However, one of skill in the art will recognize that the specification data can be stored and organized in as few as one file, or split up into any number of files.

The Local Address Format Specification

The local address format specification 2 is a listing that contains human readable specifications (or grammar) of legal address forms. An abbreviated example of this address line grammar is:

```
HouseNumber;StreetName;PostStreetType;PostDir;UnitNumber;
HouseNumber;StreetName;PostDir;UnitNumber;
HouseNumber;StreetName;PostStreetType;UnitNumber;
POBox;POBoxNumber;
POBox;POBoxNumber;DeliveryInstallation;
RR;RRNumber;
RR;RRNumber;DeliveryInstallation;
etc.
```

This file is read by the universal parser 1 and transformed into a internal parse tree that the parsing engine 1 traverses in its analysis of the input data. The tree for the above set of address definitions would look like:

```
HouseNumber
    StreetName
        PostStreetType
            PostDir
                UnitNumber
                UnitNumber
            PostDir
                UnitNumber
POBox
    POBoxNumber
        DeliveryInstallation
RR
    RRNumber
        DeliveryInstallation
```

The left-most items on the tree are the primary nodes and the further indentations represent the second, third, and fourth nodes that depend from their respective node branches. In this example, the parser 1 would look to determine whether the input address (i.e. 123 Main Street) starts with a house number, a post office box, or a rural route. If the beginning of the input matches the requirements for a house number, then the "StreetName" branch will be examined to determine whether the requirements for a street name are met. The parser 1 applies each node of the parse tree to the input address to discover which path through the tree encompasses the input address line.

The Local Address Component Rules Specification

The local address component rules file 3 is used to define the elements in the parse tree and logic used when examining the input string. For example, for the particular region, it is necessary to define what alphanumeric combination of characters qualify as a house number. In the U.S., for example, various combinations of numbers, letters and fractions can qualify as house numbers. In other countries, different combinations, or different symbols like dashes and commas may be applicable. The rules file 3 contains regular expressions, branching logic control, and address element definitions such as the following example:

```
parser.regex.HouseNumber=[a-zA-Z]?[0-9]+[a-zA-Z]?( (1/4|1/2|3/4))?
parser.regex.-
POBox=POBOX|POSTOFFICEBOX|POB|BOX|PO|POSTOFCBOX
|POBO|PODRAW|PBOX|FIRMCALLER|POSTBOX
parser.regex.PostDataBaseStreetType=ABBEY|ACRES|ALLEY|AV|AVE|
AVENUE|BAY
parser.regex.GD.trycombine=Y
parser.regex.POBox.trycombine=N
parser.regex.HouseNumber.combineInts=N
aliases.ordinalstreetname0 = ONE,1,FIRST,1ST
aliases.streettype2 = BOULEVARD,BOUL,BLVD,BOULV
*Note: "GD" stands for "general delivery."
```

These settings allow the parser 1 to recognize address line elements (such as house numbers), take different logic paths (such as whether to combine results for GD or POBox or HouseNumbers), and detect aliases for certain address line elements (such as streetnames and streettypes). The same parser 1 code executes for all countries, thus avoiding the need for country-specific parsing engines, as exist in prior art systems. The country specific differences are all accounted for in the format and rules specification files 2 and 3.

Exemplary Parser Operation

The parser 1 begins by reading the files 2 and 3 described above and building data structures that reflect the content of the files. After reading the parsing grammar file 2 and the parsing rules file 3, the parser is configured to be able to parse addresses for a particular locale. Addresses submitted to the parser 1 can be processed in the following exemplary sequence of steps:

Divide the address into tokens based on whitespace. "123 Main Street" would form 3 tokens This first tokenization is the default "experiment". The parser 1 tries to apply the parse tree to this experiment. If it is successful in mapping the tokens to a branch of the parse tree, this is considered a successful parsing and is saved. A single experiment can, and often does, have several successful parsing associated with it, which means that a single tokenization of the input address can be interpreted in multiple, valid ways. However, even a successful parsing may have some "penalties" associated with it, such as a penalty for having what would otherwise be a legal street type as part of the street name, as in "123 GateWay" (where "Way" is also recognized as a legal street type). The concept of assigning penalties in address parsing will be known to one of skill in the art, and need not be described in detail here.

As intermediate successes in applying a node of the parse tree are made, new "experiments" are formed from these partial successes. The new experiments are different tokenizations of the original address line. Different tokenizations of the initial default experiment are created by joining adjacent tokens or splitting individual tokens. In general, once a token has been successfully matched to a street element, the next token is joined to it, forming a new experiment. For example, this is how "123 Winding Trail Dr" would have the experiment, "123 WindingTrail Dr" formed. The token, "Winding", qualifies as a legal streetname, so the next token, "Trail" would be joined to it, forming a new experiment. This new experiment is the one that would eventually produce an unpenalized, perfect parsing.

The new experiments are run through the parse tree, and new parsings are formed from each of them when the traversal is successful.

When all possible experiments have been tried, many rejected, and some accepted, the parser has produced a set of successful parsings.

These successful parsings are scored (scoring sums up the total of the parsing penalties) and the parsings are sorted from best to worst. The best parsings have the fewest penalties, and the worst parsings have the most penalties. Techniques for scoring based on parsing penalties will be known to one of skill in the art, and need not be described in detail here.

Eventually, the geocoding system 4 will process the best parsings produced by universal parsing engine 1, looking for a match in the database of street records of the geocoding system 4.

Figure 2:
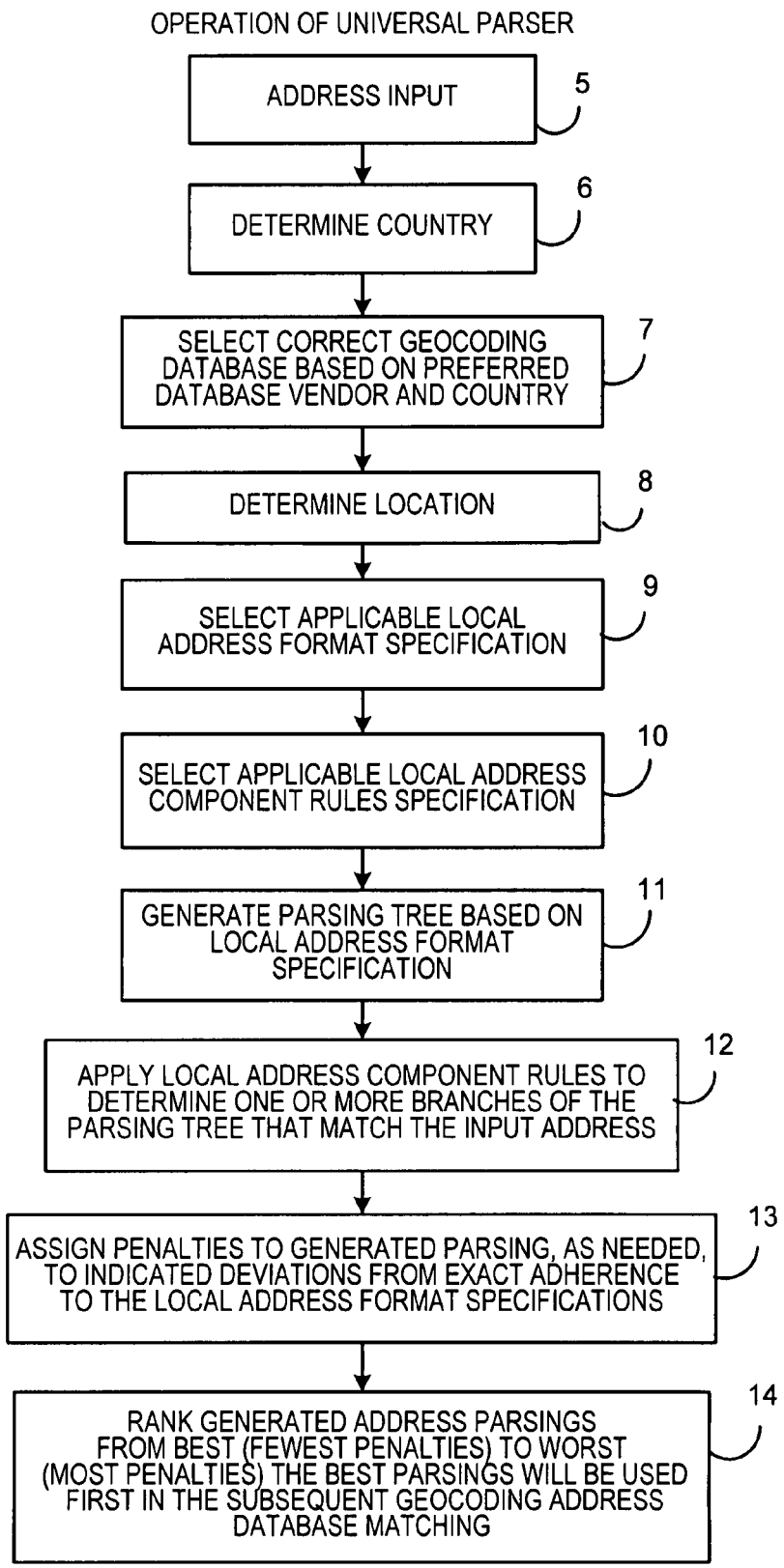
FIG. 2 is a flowchart of the operation of the universal parsing engine shown in FIG. 1.

FIG. 2 depicts a preferred embodiment for controlling the operation of the operation of the universal parser 1, and that is compatible with the components described above in connection with FIG. 1. An address is input for parsing in step 5. At step 6, the country of the address is determined using known techniques. An application may select a country by a default setting, the country may be provided as an additional input, or known country analysis techniques may be applied. The exemplary process further includes a step 7 of selecting a geocoding database based on a preferred database vendor and country. For this embodiment, that step 7 is needed because different vendors may organize their geocoding databases differently, or have different formatting requirements for the different address components. Thus for the purpose of "making sense" of the input address for further analysis, it is important to know in advance the nuances in formatting that different geocoding databases might have, so that the parsed address can be properly matched with the geocode data. However, the selection of the database doesn't really affect parsing at all. Parser 1 does not alter how addresses are parsed based on which database is used. The database selection is done very early in the geocoder initialization, but it doesn't affect the parsing rules, element formatting, or parsings that are generated. These things are all controlled by files 2 and 3.

A further step 8 is to determine the locale applicable for the address. The locale is a potential subset of the country, where different address formats and rules may be applicable. For example, Canada may include English and French locales. English and French conventions will be different for addresses, so different formats and rules are applicable. In other countries, the locale may include the whole company if uniform conventions are applicable everywhere.

At steps 9 and 10, the applicable local address format specification 2 and local address component rules specification 3 are selected based on locale/country. A parsing tree is generated based on the local address format specification 2 (step 11). The local address component rules 3 are applied to determine one or more branches of the parsing tree that match the input address (step 12). At step 13, penalties are assigned to potential parsings that were determined in step 12. Penalties indicate deviations from exact adherence to the local address format specifications 2. At final parsing step 14, the potential parsed addresses are ranked based on the number of penalties, and the best parsings will be used first in subsequent geocoding address database matching.

With regard to FIG. 2, it should be understood that certain steps, including steps 9 through 11, might occur prior to the input of an address for geocoding at step 5. For example, a preferred embodiment includes generating all parsing trees upon initiation of the geocoding system. Thus, when the address is input (step 5) the appropriate parsing tree for the locale is selected from the group of parsing trees that were already generated. It will be understood by one of skill in the art that the particular timing of generating the parsing trees is not important for practicing the invention.

The generated parsings resulting from the method of FIG. 2 may be perfect ("123 East Main Street" would have no penalties if the address elements are assigned to house number, Predirectional, Streetname, Streettype). Or they may be imperfect ("123 EastMain Street", if the address elements are assigned to housenumber, Streetname, and Streettype). The second parsing would have a penalty indicating "joined a predirectional element to another token", and would rank lower than the unpenalized parsing. Later, during the database matching phase in the geocoding system 4, the highest ranking parsings would be tried first in comparison to the database of actual addresses. If no matches are found for the best parsings, the geocoding system 4 can try lower ranking parsings. At some point the geocoding system 4 stops trying to match parsings if the only ones left have a parse score less than some user-specified threshold.

A Further Embodiment of the Parsing Engine:

The following definitions and parsing steps describe a further embodiment of the parsing engine 1 that is compatible with the features described above.

Definitions:

A "parsing context" consists of a string tokenization of the address, assignments of the tokens to different address element types, penalties accrued during the tokenization and parsing, and a pointer to the current token being examined. During parsing these parsing contexts are frequently cloned and duplicated as we need to pursue divergent paths down the Parse tree. The system records the Context's "experience" to a branch point in a tree, and then lets one or more "clones" evolve in different directions down the branches of the parse tree.

The "experiment list" is a list of experimental parsing contexts with no penalties assigned and no assignment of address element types. Only the tokenization has been done. Parser 1 begins with the basic experiment (each token treated separately). As parser 1 progresses through the traversals, it tries different ways to join (or separate) tokens and put these into the experiment list to try later.

The "parsing context stack" also contains parsing contexts, but with more information filled-in and complete. The parsing context stack exists only for the duration of the parsing of a single "experiment". Each context in the stack contains the exact same tokenization, but differs in how the tokens have been assigned to addressline elements and in accrued penalties. So, it has the same tokenization, but different address element interpretations.

The "successful parsing contexts" are the parsing contexts that have made it all the way through the parsing analysis and resulted in a complete address.

Important concepts for this preferred embodiment of the parsing engine 1 are: (1) multiple tokenization "experiments" are processed; (2) within each experiment, there are from zero to "N" successful parsings; (3) the parser 1 searches for each successful parsing in the address database, keeping track of penalties in those matches; and (4) the parser 1 chooses the match with the fewest match penalties as the winner. In processing the tokens with the parser 1, some experiments will utterly fail to parse at all, and will have zero successful parsings. Other ambiguous experiments will have several successful parsings.

Examples of Experiments:
"123 WestGate Way"
"123 West Gate Way"
"123 West GateWay"
"123 WestGateWay"

Examples of Successful Parsings of Experiment, "123 WestGate Way":

123(housenum) WestGate(streetname) Way (streettype)—This parsing has two penalties: "joined token is rare streettype" and "joined token is directional". It also has a "negative" penalty, which is "reduced token is rare streettype". This is assigned because the token, "Way" was eventually found and assigned to a streettype element. This "negative" penalty essentially removes the effect of the previous "joined token is rare streettype" penalty.

123(housenum) WestGate(streetname) Way (unitnum)—This parsing has three penalties: "joined token is rare streettype", "joined token is directional", and "unitnumber is streettype". Although the tokenization of both parsings is identical, the assignment of the tokens in the second parsing to different address elements results in it having more penalties, thus being "worse" than the first parsing.

Example of Failed Parsing of One Experiment:

123(housenum) West (streetname) GateWay—This fails. "GateWay" is not a streettype, postdir, unittype, or unitnumber. In this example, the token "GateWay" does not satisfy any of the rules for legal address elements in the parsing tree branches still being considered.

An Exemplary Local Address Format Specification

The following listing is a "human readable address template" corresponding to a local address format specification 2 used for generating a parsing tree in the parser 1. As an administrator for the parser 1 discovers more valid input address formats, he or she would add them to this file. Each time the parser engine is started, it reads this file and then builds the tree of valid addresses each node on the tree being an address element). This file generates a parse tree inside the parse engine for the "en_CA" locale (english speaking Canada) after the parsing engine has read the following.

Local Address Format Specification File:

```
// This contains the "schema" for valid addresses in Canada.
// The order and content of the address elements are important. The element
// names are directly related to the internal Java class names and are used
// by a factory to create the corresponding objects (so don't change their
// spelling).
//
// Full line comments, beginning with "//" semicolon, are OK.
// Do not insert any blank lines or add comments to the end of address lines.
//
// For example, to describe a en_CA address containing these address elements:
// 100A Mighty Quinn Road South Apt 13C
// use:
// HouseNumber;StreetName;PostStreetType;PostDir;UnitType;UnitNumber;
//
//
// *** Begin OneStreet style parse tree ***
//
// These have no HouseNumber
StreetName;PostStreetType;PostDir;
StreetName;PostDir;
StreetName;PostStreetType;
StreetName;
PreDir;StreetName;
StreetName;PostStreetType;
PreDir;StreetName;PostStreetType;PostDir;
PreDir;StreetName;PostDir;
PreOrdinalStreetType;OrdinalStreetName;
OrdinalStreetName;PostOrdinalStreetType;
PreDir;PreOrdinalStreetType;OrdinalStreetName;
PreDir;OrdinalStreetName;PostOrdinalStreetType;
PreOrdinalStreetType;OrdinalStreetName;PostDir;
OrdinalStreetName;PostOrdinalStreetType;PostDir;
//PreDir;OrdinalStreetName;PostOrdinalStreetType;PostDir;
//
// These 8 have no UnitType or UnitNumber at all
HouseNumber;StreetName;PostStreetType;PostDir;
HouseNumber;StreetName;PostDir;
HouseNumber;StreetName;PostStreetType;
HouseNumber;StreetName;
HouseNumber;PreDir;StreetName;
HouseNumber;PreDir;StreetName;PostStreetType;
HouseNumber;PreDir;StreetName;PostStreetType;PostDir;
HouseNumber;PreDir;StreetName;PostDir;
//
// These 8 are just like the above, but all have UnitNumber (no UnitType)
HouseNumber;StreetName;PostStreetType;PostDir;UnitNumber;
HouseNumber;StreetName;PostDir;UnitNumber;
HouseNumber;StreetName;PostStreetType;UnitNumber;
HouseNumber;StreetName;UnitNumber;
HouseNumber;PreDir;StreetName;UnitNumber;
HouseNumber;PreDir;StreetName;PostStreetType;UnitNumber;
HouseNumber;PreDir;StreetName;PostStreetType;PostDir;UnitNumber;
HouseNumber;PreDir;StreetName;PostDir;UnitNumber;
```

```
//
// These 8 are just like the above, but all have UnitType AND UnitNumber
HouseNumber;StreetName;PostStreetType;PostDir;UnitType;UnitNumber;
HouseNumber;StreetName;PostDir;UnitType;UnitNumber;
HouseNumber;StreetName;PostStreetType;UnitType;UnitNumber;
HouseNumber;StreetName;UnitType;UnitNumber;
HouseNumber;PreDir;StreetName;UnitType;UnitNumber;
HouseNumber;PreDir;StreetName;PostStreetType;UnitType;UnitNumber;
HouseNumber;PreDir;StreetName;PostStreetType;PostDir;UnitType;UnitNumber;
HouseNumber;PreDir;StreetName;PostDir;UnitType;UnitNumber;
//
// These 8 have UnitNumber at the beginning as the first token, before the HouseNumber.
UnitNumber;HouseNumber;StreetName;PostStreetType;PostDir;
UnitNumber;HouseNumber;StreetName;PostDir;
UnitNumber;HouseNumber;StreetName;PostStreetType;
UnitNumber;HouseNumber;StreetName;
UnitNumber;HouseNumber;PreDir;StreetName;
UnitNumber;HouseNumber;PreDir;StreetName;PostStreetType;
UnitNumber;HouseNumber;PreDir;StreetName;PostStreetType;PostDir;
UnitNumber;HouseNumber;PreDir;StreetName;PostDir;
//
//
HouseNumber;PreStreetType;StreetName
//
// These have ordinal streetname aliases
HouseNumber;PreOrdinalStreetType;OrdinalStreetName;
HouseNumber;OrdinalStreetName;PostOrdinalStreetType;
HouseNumber;PreDir;PreOrdinalStreetType;OrdinalStreetName;
HouseNumber;PreDir;OrdinalStreetName;PostOrdinalStreetType;
HouseNumber;PreOrdinalStreetType;OrdinalStreetName;PostDir;
HouseNumber;OrdinalStreetName;PostOrdinalStreetType;PostDir;
HouseNumber;OrdinalStreetName;PostOrdinalStreetType;UnitType;UnitNumber;
HouseNumber;OrdinalStreetName;PostOrdinalStreetType;PostDir;UnitType;UnitNumber;
UnitNumber;HouseNumber;OrdinalStreetName;PostOrdinalStreetType;
HouseNumber;OrdinalStreetName;PostOrdinalStreetType;UnitNumber;
UnitNumber;HouseNumber;OrdinalStreetName;PostOrdinalStreetType;PostDir
//HouseNumber;PreDir;OrdinalStreetName;PostOrdinalStreetType;PostDir; - I have not seen this one occur
HouseNumber;OrdinalStreetName;PostOrdinalStreetType;
//
// POBoxes
POBox;POBoxNumber;
POBox;POBoxNumber;DeliveryInstallation;
//
// Rural Route
RR;RRNumber;
RR;RRNumber;DeliveryInstallation;
//
// General Delivery
GD;
GD;DeliveryInstallation;
//
// Other rarer, but still legal addresslines
// StreetName;PostStreetType;
//
// *** Begin Intersection style parse tree ***
//
StreetName;
StreetName;PostDir;
StreetName;PostStreetType;
PreStreetType;StreetName;
StreetName;PostStreetType;PostDir;
PreDir;StreetName;PostStreetType;
PreDir;StreetName;PostStreetType;PostDir;
OrdinalStreetName;PostOrdinalStreetType;
OrdinalStreetName;PostOrdinalStreetType;PostDir;
PreOrdinalStreetType;OrdinalStreetName;
PreDir;OrdinalStreetName;PostOrdinalStreetType;
PreDir;StreetName;PostStreetType;PostDir;
//PreDir;OrdinalStreetName;PostOrdinalStreetType;PostDir;
```

Resulting Parse Tree from the Above Format Specification File

The following is a parsing tree generated by parser 1 based on the format specification 2 given above:

```
Single Street parse tree
========================
StartNode
  StreetName
    PostStreetType
      PostDir
      PostDir
  PreDir
    StreetName
      PostStreetType
        PostDir
        PostDir
    PreOrdinalStreetType
      OrdinalStreetName
    OrdinalStreetName
      PostOrdinalStreetType
  PreOrdinalStreetType
    OrdinalStreetName
      PostDir
  OrdinalStreetName
    PostOrdinalStreetType
      PostDir
  HouseNumber
    StreetName
      PostStreetType
        PostDir
          UnitNumber
          UnitType
            UnitNumber
          UnitNumber
          UnitType
            UnitNumber
        PostDir
          UnitNumber
          UnitType
            UnitNumber
        UnitNumber
        UnitType
          UnitNumber
    PreDir
      StreetName
        PostStreetType
          PostDir
            UnitNumber
            UnitType
              UnitNumber
            UnitNumber
            UnitType
              UnitNumber
          PostDir
            UnitNumber
            UnitType
              UnitNumber
          UnitNumber
          UnitType
            UnitNumber
      PreOrdinalStreetType
        OrdinalStreetName
      OrdinalStreetName
        PostOrdinalStreetType
      PreStreetType
        StreetName
      PreOrdinalStreetType
        OrdinalStreetName
          PostDir
      OrdinalStreetName
        PostOrdinalStreetType
          PostDir
            UnitType
              UnitNumber
            UnitType
              UnitNumber
            UnitNumber
      UnitNumber
    HouseNumber
      StreetName
        PostStreetType
          PostDir
          PostDir
        PreDir
          StreetName
            PostStreetType
              PostDir
            PostDir
        OrdinalStreetName
          PostOrdinalStreetType
            PostDir
    POBox
      POBoxNumber
        DeliveryInstallation
    RR
      RRNumber
        DeliveryInstallation
    GD
      DeliveryInstallation
Intersection parse tree
========================
StartNode
  StreetName
    PostDir
    PostStreetType
      PostDir
    PreStreetType
      StreetName
    PreDir
      StreetName
        PostStreetType
          PostDir
      OrdinalStreetName
        PostOrdinalStreetType
    OrdinalStreetName
      PostOrdinalStreetType
        PostDir
    PreOrdinalStreetType
      OrdinalStreetName
<<en_CA.parsetree>>
```

Selecting Applicable Geocoding Database:

At step 7 of FIG. 2, the geocoding database is selected. Parsers are created during initialization depending on which geocoding databases the system is interfacing with. This step is controlled by a further database property file. In an exemplary embodiment, the database property file can be named gsi.database.properties. It looks like this:

```
UPU.BR=\\\\cog1file1/gsi/2.1
TELEATLAS.BR=\\\\cog1file1/gsi/2.1
NAVTEQ.GB=d:/data/gsi
NAVTEQ.IE=d:/data/gsi/
DMTI.CA=d:/data/gsi/
NAVTEQ.CA=d:/data/gsi/
```

This file identifies the databases intended for use for the program execution. During initialization of the geocoding engine, it reads this file and discovers that 6 databases will be used (two for Brazil, one for Great Britain, one for Ireland, and two for Canada, totaling 4 different countries). The locales for these countries are discovered by querying the database for this information. These queries reveal that the following 5 locales are supported by the databases:
pt_BR—Portuguese Brazil
en_CA—English Canada
fr_CA—French Canada
en_GB—English Great Britain
en_IE—English Ireland The geocoding engine creates 5 different geocoders (one per locale). Each geocoder has its own parser, matcher, scorer, and database pool. Focusing here only on the parser piece of the geocoder, the parser code used for each locale is identical. As mentioned above, the only difference between the parsers is how they are initialized. To reiterate, each locale-specific parser is initialized with different property files for legal address parsings and street element rules.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A computer implemented method of parsing an address for automated processing, the method comprising:
   receiving an input address;
   determining, with a processor, a relevant locale for the input address;
   selecting, with the processor, an applicable local address format specification based on the relevant locale;
   selecting, with the processor, an applicable local address component rules specification based on the relevant locale;
   applying, with the processor, the local address format specification and the local address component rules to a parsing engine to determine one or more potential parsed addresses based on compliance of the input address with formats embodied in the local address format specification and the local address component rules specification;
   generating a parsing tree based on the local address format specification; and
   applying the local address component rules specification to the parsing engine to determine one or more branches of the parsing tree for which the input address matches criteria of the component rules specification.

2. The method of claim 1 further comprising the step of assigning penalties when disfavored matches occur in applying the input address to the one or more branches of the parsing tree.

3. The method of claim 2 further comprising ranking the one or more parsing tree branches that include matches based on the assigned penalties.

4. A computer implemented method of parsing an address for automated processing, the method comprising:
   storing a local address format specification on a storage device;
   storing a local address component rules specification on the storage device;
   generating, with a processor, a plurality of parsing trees based on the local address format specification;
   receiving an input address;
   determining, with the processor, a relevant locale for the input address;
   selecting, with the processor, a relevant parsing tree from the plurality of parsing trees based on the relevant locale; and
   applying, with the processor, the local address component rules specification to the input address in view of the relevant parsing tree to determine one or more branches of the relevant parsing tree for which the input address matches criteria of the component rules specification.

5. The method of claim 4 further comprising the step of assigning penalties when disfavored matches occur in applying the input address to the one or more branches of the parsing tree.

6. The method of claim 5 further comprising ranking the one or more parsing tree branches that include matches based on the assigned penalties.

7. An address parsing computer system applicable for use across different regions having different addressing formats and rules, the system comprising:
   a storage device configured to store a local address format specification including a listing formatting sequences of address components that are allowed in a particular region;
   the storage device configured to store a local address component rules specification including a plurality of rules identifying the composition of particular address components; and
   a processor configured with a universal parsing engine composed independently of the local address format specification and the local address component rules specification, the universal parsing engine arranged to determine one or more potential parsed addresses based on compliance of an input address with formats embodied in the local address format specification and the local address component rules;
   wherein the universal parsing engine is further arranged to generate a parsing tree based on the formatting sequences of the local address format specification, and to apply the local address component rules to determine one or more branches of the parsing tree for which the input address matches criteria of the component rules specification, thereby determine compliance with formats embodied in the local address format specification and the local address component rules.

8. The address parsing system of claim 7 wherein the universal parsing engine is further arranged to assign penalties when disfavored matches occur in applying the input address to the one or more branches of the parsing tree.

9. The address parsing system of claim 8 wherein the universal parsing engine is further arranged to rank the one or more parsing tree branches that include matches based on the assigned penalties.

* * * * *